United States Patent [19]
Grundman

[11] 3,979,833
[45] Sept. 14, 1976

[54] METHOD AND MEANS FOR ESTABLISHING THE CORNERS OF A MULTIPLE-SIDED LOT

[76] Inventor: Thomas B. Grundman, 513 Park Ave., Cherokee, Cherokee County, Iowa 51012

[22] Filed: Feb. 3, 1975

[21] Appl. No.: 546,387

[52] U.S. Cl. ............................ 33/138; 33/1 G; 242/84.8; 242/96
[51] Int. Cl.² ....................................... G01B 3/02
[58] Field of Search ........... 33/138, 137 R, 1 CC, 33/1 G; 242/84.8, 96, 56.9, 80, 86.1, 118.4, 118.41

[56] References Cited
UNITED STATES PATENTS

| | | | |
|---|---|---|---|
| 870,884 | 11/1907 | Holinger | 33/137 R |
| 3,289,306 | 12/1966 | Todd | 33/138 |
| 3,338,536 | 12/1967 | Hull et al. | 242/96 |

FOREIGN PATENTS OR APPLICATIONS

| | | | |
|---|---|---|---|
| 1,300,851 | 7/1962 | France | 33/137 R |
| 2,213 | 2/1889 | United Kingdom | 33/137 R |

Primary Examiner—Richard E. Aegerter
Assistant Examiner—Willis Little
Attorney, Agent, or Firm—Zarley, McKee, Thomte, Voorhees & Sease

[57] ABSTRACT

A pair of tape measures are mounted in side-by-side relationship on a common axial shaft with a clutch plate between them operable by a crank on the shaft. Pressure may be applied to the reels and in turn to the clutch plate by thumb adjustment nuts on the outer ends of the shaft, such that the reels may turn together or remain stationary as the shaft is turned. The method of using the measuring device to lay out a lot involves attaching the free end of one tape to a stake at one corner and then walking to a second corner while the first tape is being unreeled. The free end of the second tape is attached to a stake at the second corner, and then the measuring device is moved to a third corner with the tapes being appropriately extended or contracted, and the stake is placed at the intersection of the measured distances on both tapes. Next, the measuring device is moved to the fourth corner, and a stake is placed at the intersection of the known measured distances on each of the tapes. Verification of the layout may be obtained by going back to the third corner and measuring the distance between the third and fourth corners.

9 Claims, 8 Drawing Figures

U.S. Patent  Sept. 14, 1976  3,979,833
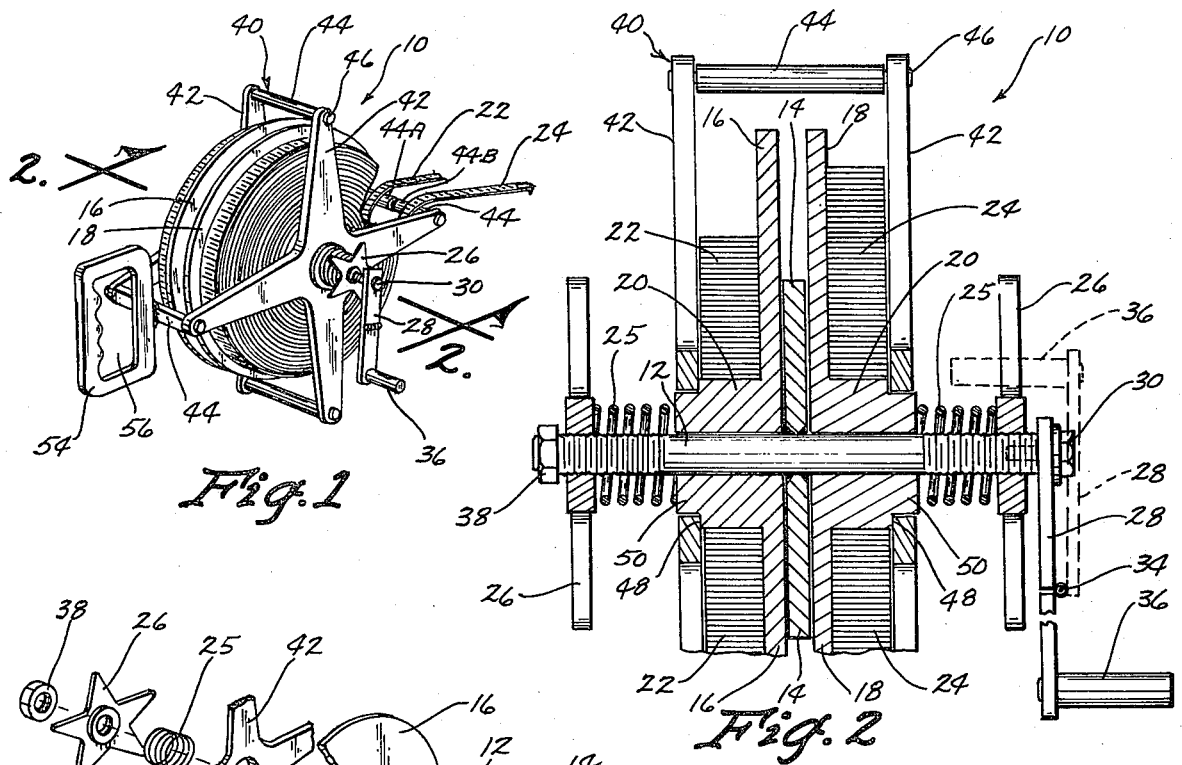
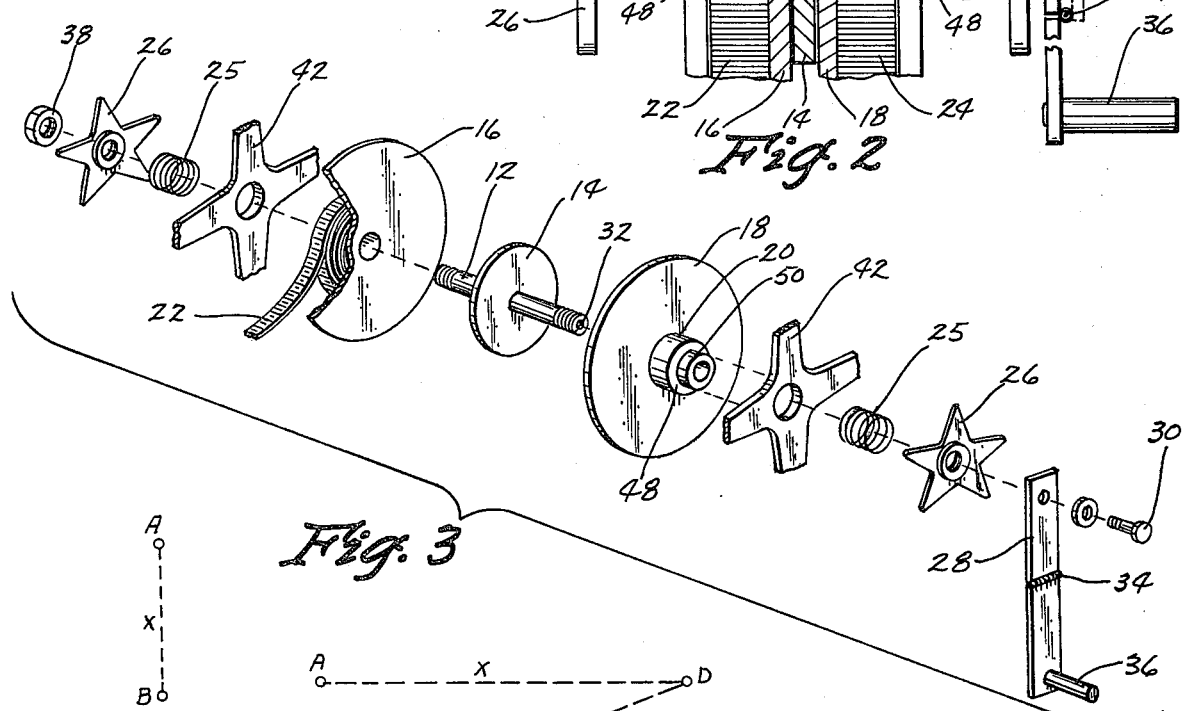

METHOD AND MEANS FOR ESTABLISHING THE CORNERS OF A MULTIPLE-SIDED LOT

BACKGROUND OF THE INVENTION

The laying out of the lot for construction of a building or the like has previously involved various cumbersome and time-consuming approaches wherein surveying instruments may be used and considerably walking and measuring is required to establish the four corners of the building. Several workmen and measuring tapes may be required to lay out an ordinary building lot.

SUMMARY OF THE INVENTION

The measuring device of this invention makes it possible for one person to quickly and easily lay out a lot by establishing the four corners of the lot. The measuring device involves a pair of measuring tapes on reels which are adapted to be rotated as an axial shaft on which the wheels are carried is rotated or one remains stationary as the other reel is being turned by a crank connected to the axial shaft. Unwinding of the measuring tape is accomplished by merely walking away from the anchoring stakes to which the free ends of the measuring tapes are connected thereby causing the reels to unwind the tape. One tape may be wound in while the other tape is being let out by the operator moving towards the anchoring stake for the first tape and away from the anchoring stake for the second tape while operating the crank which in turn turns the axial shaft thereby causing the driving clutch plate to turn the one reel. The reels may be quickly engaged with the driving clutch plate by making hand adjustments on the star-shaped nuts at the outer ends of the axial shaft which apply pressure to springs which in turn engage the outer surfaces of the reels thereby pressing them against the driving clutch plate to be frictionally turned therewith. The crank includes a hinge for folding it upon itself whereby the device may be made more compact.

The actual method of using the measuring device to lay out the four corners of a lot involve first attaching the free end of one tape to a stake at one corner and then walking off the known distance to the second corner while the tape is being unreeled. The free end of the second tape is attached to a stake at the second corner and then the measuring device is moved to a third corner with the tapes being appropriately extended or retracted and the known distances on each of the tapes at the point of their intersection establishes the location of the stake for the third corner. The measuring device is then moved to the fourth corner with the free ends of the measuring tape being retained at their anchoring stakes at the first and second corners. The distances to the fourth corner from the first and second corners is known and thus the stake at the fourth corner may be placed at the intersection of the measured distances on the first and second tapes. A further check of the lot layout may be accomplished through measuring the distance between the third and fourth corners by moving back to the third corner from the fourth corner and measuring this distance on one of the tapes which will for this step have been disconnected from its initial anchoring stake and re-anchored at the fourth corner anchoring stake.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the measuring device of this invention;

FIG. 2 is a cross-sectional view taken along lines 2—2 in FIG. 1;

FIG. 3 is an exploded perspective view thereof;

FIG. 4 is a diagrammatic view of the first step of laying out a lot utilizing the measuring device of this invention;

FIG. 5 illustrates the second step of the procedure;

FIG. 6 represents the third step diagrammatically;

FIG. 7 illustrates a fourth possible step;

FIG. 8 diagrammatically illustrates the known information about the lot to be laid out including distances and angles between adjacent sides.

DESCRIPTION OF THE PREFERRED EMBODIMENT

The measuring device of this invention is referred to generally in FIG. 1 by the reference numeral 10. A center shaft 12 includes an integrally-driven clutch plate 14 adapted to frictionally engage and drive oppositely disposed reel plates 16 and 18, also mounted on the shaft 12 and having hubs 20 on which measuring tapes 22 and 24 are stored. Outwardly of the hubs 20 on the shaft 22 are compression springs 25 engaged outwardly thereof by thumb-operated, star-shaped adjustment nut elements 26 which are threadably carried on the shaft 12 for varying the pressure between the driven plates 16 and 18 against the driving clutch plate 14.

The shaft 12 and driving clutch plate 14 are rotated by a hand-operated crank 28, rigidly connected to the shaft 12 by a bolt 30 threaded into the threaded end 32 of the shaft 12. The crank 28 is foldable through operation of a hinge 34, and a handle 36 is provided on the outer free end of the crank. At the opposite end of the shaft 12, a retaining nut 38 is provided to prevent inadvertent disassembling of the measuring device.

A frame 40 is provided for the measuring device and includes a pair of star-shaped side members 42 interconnected by four cross sleeves 44 mounted on bolts 46. The frame members 42 engage the outer end surfaces 48 of the hubs 20 and ride on hubs 50 positioned outwardly of the hub 20. A vertically-oriented handle 54, rectangular in shape and having an opening 46 for a person's hand, is mounted on one of the cross member sleeves 44. The oppositely-positioned cross member 44 includes a pair of guide rollers 44A and 44B over which the tapes 22 and 24 extend.

The procedure following in using the measuring device of this invention for establishing the corners of the multiple-sided lot is illustrated in one example in FIGS. 4 - 8. The free end of the tape "X" is secured to a stake at corner "A," and the measuring device is then moved to corner "B," a known distance and direction away. At corner B, the free end of tape "Y" is secured to a stake, and the measuring device is then moved to corner "C," which is a known distance away, and a stake is positioned in the ground at the point where the known distances on tapes X and Y intersect, as seen in FIG. 5. Next, the measuring device is moved to corner "D," which is also a known distance away from corners A and B on tapes X and Y, and where the tapes intersect, a stake is placed. In the step illustrated in FIG. 6, tape X would be reeled in, and tape Y would be reeled out, while in FIG. 5 both tapes would be reeled out by walking away from the anchoring stakes at corners A and B. Verification of the layout can now be made by measuring the distance from D to C, as illustrated in FIG. 7, by using either tape X or Y. In moving from corners C to D tape X will be reeled in by operation of the crank and tape Y will be let out by walking away from the anchoring stake at corner B.

In FIG. 8, the known information about the lot to be laid out is illustrated. The most important information is the distance for each of the legs, including the diagonal leg A–C, which would be equal to the diagonal leg B–D.

It is to be understood that FIGS. 4 – 8 represent only one specific sequence that may be followed, and that after corner B has been established, the measuring device may be moved to either corner C, as illustrated in FIG. 5, or to corner D. Furthermore, starting from corner A, corner C could be established second, even though it is diagonally located relative thereto. Next, either corners B and D can be established following the same procedures.

It is thus seen that both tapes may be reeled in or out simultaneously, or one tape may be extended while the other tape is being reeled in. Operation of the thumb adjustment means 26 controlling the reels for each tape allows for this versatility. When the tapes are being unreeled, the crank 28 need not be operated, since the operator will walk away from the anchoring stakes thereby causing the reels to unwind the tapes. The crank 28 is operated only when a tape is being reeled in, and the other tape may also be reeled in, or be extended, or merely remain stationary as the shaft turns. It is thus apparent that a substantial savings in time and effort will be enjoyed through use of the measuring device of this invention, following the method disclosed.

What is claimed is:

1. A measuring device comprising,
    a pair of tape reels mounted on a common axial shaft,
    a length of measuring tape rolled on each reel,
    means for turning said shaft, and
    locking means for selectively locking either or both of said reels to said shaft for rotation therewith or independently thereof as said tapes are reeled in or out, said locking means including a clutch plate locked to said shaft and disposed between said pair of reels for rotation with said shaft, and individually selectively adjustable pressure means on said shaft for engagement with each of said reels to cause them to frictonally engage said clutch plate and thereby turn therewith.

2. The structure of claim 1 wherein said pressure means includes a spring on each end of said shaft adapted to bear against the adjacent reel and an axially adjustable nut on each end of said shaft adapted to engage the adjacent spring to apply pressure to the adjacent reel.

3. The structure of claim 1 wherein said means for turning said shaft is a crank integrally connected to said shaft.

4. The structure of claim 1 wherein said shaft is supported at opposite ends by oppositely disposed side frame members interconnected outwardly of the periphery of said reels by cross members and one of said cross members includes a handle.

5. The structure of claim 4 wherein said side frame members are star shaped and said cross members connect the side frame members at the points of said star shaped side frame members with the free ends of said tapes being adapted to extend outwardly over one of said cross members.

6. The structure of claim 1 wherein said reels each include only one sidewall and said one sidewall being adjacent said clutch plate for engagement therewith, and stationary side frame members on said shaft outwardly of each reel limit lateral movement of said tape on each of said reels.

7. The structure of claim 3 wherein said crank includes a hinge for folding said crank onto its self.

8. A method of establishing the corners of a four-sided lot when the lengths of the sides are known using a measuring device having a pair of tape means operatively connected to reeling means for reeling in or out one or both tapes simultaneously, said method comprising the steps of,
    securing the free end of one tape at one corner,
    moving the measuring device a known direction and distance to a second corner,
    securing the free end of the second tape at the second corner,
    moving the measuring device to a third corner while reeling in or out the first and second tapes the appropriately known amounts to establish the third corner at the intersection of the first and second tapes, and
    moving the measuring device to the fourth corner while reeling in or out the first and second tapes the appropriately know amounts to establish the fourth corner.

9. The method of claim 8 wherein said method further includes the step of moving said measuring device back to said third corner for checking the distance between the third and fourth corners against the known distances for the side of the lot.

* * * * *